(12) United States Patent
Marshall et al.

(10) Patent No.: US 11,674,823 B2
(45) Date of Patent: Jun. 13, 2023

(54) ROTARY ENCODER

(71) Applicant: CMR SURGICAL LIMITED, Cambridge (GB)

(72) Inventors: Keith Marshall, Cambridge (GB); Christopher James Roach, Cambridge (GB); Paul Christopher Roberts, Cambridge (GB); Steven James Randle, Cambridge (GB)

(73) Assignee: CMR SURGICAL LIMITED, Cambridge (GB)

( * ) Notice: Subject to any disclaimer, the term of this patent is extended or adjusted under 35 U.S.C. 154(b) by 0 days.

(21) Appl. No.: 17/726,740

(22) Filed: Apr. 22, 2022

(65) Prior Publication Data
US 2022/0244079 A1  Aug. 4, 2022

Related U.S. Application Data

(63) Continuation of application No. 16/839,287, filed on Apr. 3, 2020, now Pat. No. 11,333,531, which is a continuation of application No. 15/746,121, filed as application No. PCT/GB2016/052263 on Jul. 22, 2016, now Pat. No. 10,627,260.

(51) Int. Cl.
*G01D 5/245* (2006.01)
*G01D 5/14* (2006.01)

(52) U.S. Cl.
CPC ........... *G01D 5/2454* (2013.01); *G01D 5/145* (2013.01)

(58) Field of Classification Search
CPC ........ G01D 5/2454; G01D 5/145; G01D 5/02; G01D 5/125
USPC .................... 324/207.25, 207.11, 200
See application file for complete search history.

(56) References Cited

U.S. PATENT DOCUMENTS

| | | | |
|---|---|---|---|
| 3,858,159 A | 12/1974 | Worth | |
| 4,068,384 A * | 1/1978 | Holy | G01D 5/34738 33/776 |
| 6,392,317 B1 | 5/2002 | Hall et al. | |
| 6,404,185 B1 | 6/2002 | Allwine | |
| 6,410,909 B1 | 6/2002 | Rudolph et al. | |

(Continued)

FOREIGN PATENT DOCUMENTS

| | | |
|---|---|---|
| CN | 101303243 A | 11/2008 |
| CN | 101586940 A | 11/2009 |

(Continued)

OTHER PUBLICATIONS

Japanese Notification of Reason(s) For Refusal, dated May 17, 2022, 3 Pages.

*Primary Examiner* — Giovanni Astacio-Oquendo
(74) *Attorney, Agent, or Firm* — Occhiuti & Rohlicek LLP

(57) ABSTRACT

A device for sensing the relative rotary position of first and second parts about a rotation axis, the device comprising a follower constrained to move on a first track fast with the first part and on a second track fast with the second part, the first track being linear and the second track comprising a plurality of circular arcs and at least one transition section connecting one of the circular arcs to another, the tracks being arranged so as to convert relative rotation of the parts into linear motion of the follower, wherein the second track is generally spiral, each circular arc is of constant radius about the rotation axis and the first track is perpendicular to the rotation axis.

20 Claims, 2 Drawing Sheets

(56) References Cited

U.S. PATENT DOCUMENTS

| | | | |
|---|---|---|---|
| 6,609,758 B1 | 8/2003 | Lefevere | |
| 9,018,944 B2 | 4/2015 | Mol | |
| 2005/0035836 A1 | 2/2005 | Howard et al. | |
| 2006/0059698 A1 | 3/2006 | Staudt et al. | |
| 2006/0174499 A1 | 8/2006 | Staudt et al. | |
| 2006/0178047 A1 | 8/2006 | Croan | |
| 2009/0076687 A1 | 3/2009 | Enache et al. | |
| 2012/0105057 A1 | 5/2012 | Mol | |
| 2016/0123729 A1* | 5/2016 | Marocchini | G01D 5/00 73/112.01 |
| 2018/0151407 A1 | 5/2018 | Stone | |
| 2018/0194003 A1* | 7/2018 | Jackson | B25J 9/046 |
| 2019/0308499 A1 | 10/2019 | Wentz et al. | |
| 2019/0308500 A1 | 10/2019 | Jain et al. | |
| 2021/0254999 A1 | 8/2021 | Darby et al. | |

FOREIGN PATENT DOCUMENTS

| | | |
|---|---|---|
| CN | 102749026 A | 10/2012 |
| CN | 103975219 A | 8/2014 |
| DE | 4436172 A1 | 4/1996 |
| DE | 10348914 A1 | 6/2005 |
| DE | 102011084933 A1 | 4/2013 |
| EP | 0953494 A3 | 2/2003 |
| EP | 3091339 A1 | 11/2016 |
| GB | 2250146 A | 5/1992 |
| JP | 1973042781 A | 9/1971 |
| JP | S58-436 A | 1/1983 |
| JP | S59126260 A | 7/1984 |
| JP | S6056213 U | 4/1985 |
| JP | S61251713 A | 11/1986 |
| JP | 1989015610 | 1/1989 |
| JP | H0236310 A | 2/1990 |
| JP | 1990-038921 A | 8/1990 |
| JP | H10-38557 A | 2/1998 |
| JP | H1029943 A | 2/1998 |
| JP | H11-211456 A | 8/1999 |
| JP | 2000-157765 A | 6/2000 |
| JP | 2001035564 A | 2/2001 |
| JP | 2005-262974 A | 9/2005 |
| JP | 2006-90982 A | 4/2006 |
| JP | 2006-125938 A | 5/2006 |
| JP | 2011-169699 A | 9/2011 |
| JP | 2013-171051 A | 9/2013 |
| JP | 2015-9658 A | 1/2015 |
| JP | 2015-020215 A | 2/2015 |
| JP | 2015-157332 A | 9/2015 |
| NO | 2013/056960 A1 | 4/2013 |

\* cited by examiner

ROTARY ENCODER

CROSS REFERENCE TO RELATED APPLICATIONS

This application is a continuation of U.S. application Ser. No. 16/839,287, filed on Apr. 3, 2020, which is a continuation of U.S. application Ser. No. 15/746,121, now U.S. Pat. No. 10,627,260, filed Jan. 19, 2018, which is a National Stage of International Application No. PCT/GB2016/052263 filed on Jul. 22, 2016, which claims priority to Great Britain Application No. 1512967.9 filed on Jul. 22, 2015, the contents of which are hereby incorporated by reference in their entireties.

This invention relates to rotary encoders, for example for sensing rotary position in robot joints.

Rotary encoders are widely used for sensing the position of rotatable elements such as shafts. Examples of their application include robot arm joints, automotive drive shafts and control wheels or knobs.

One common type of position sensor is the Hall effect magnetic sensor. These sensors have a ring around which is arranged a set of alternating magnetic poles. A sensor interacts with the ring, and is located so that the magnetic poles move past the sensor as the rotation that is desired to be sensed takes place. For example, the ring could be attached about a shaft and the sensor could be attached to a housing within which the shaft rotates. The sensor detects changes in magnetic polarity as the poles move past the sensor. By counting the number of changes in polarity the amount of rotation from a reference position can be sensed. To sense the direction of rotation two such pairs of rings and sensors can be provided, and arranged so that one sensor detects magnetic transitions of its ring at rotation positions that are offset from the positions where the other sensor detects magnetic transitions of its ring. By considering the relative timing of transitions detected by each sensor the direction of rotation can be sensed.

Similar properties can be got from other forms of two-state rotation sensing devices, for example optical sensors that sense transitions from black to white on a rotating disc, or eddy current sensors that detect the presence or absence of a tooth on a toothed wheel rotating past a sensor.

An enhancement of the approach discussed above is to measure the position of the poles relative to the sensors to multi-bit accuracy, and to arrange the rings of poles such that each position of the shaft within a 360° range is associated with a unique set of outputs from the sensors. This may be achieved by providing different numbers of poles on each ring and making the numbers of poles the rings co-prime to each other.

A problem with sensors of this nature is that they can only detect relative position, or if they can detect absolute position it is only within a range of 360°. The state detected by the sensor(s) is independent of the number of whole revolutions made by the shaft. This is immaterial for certain applications, but for other applications it requires additional steps to be taken in order to form a measurement of absolute position. One example of an application where absolute position is important is in robotics. Some robot joints may be capable of rotating more than 360°, and when the robot is operating it is important to know how many rotations have been undergone from a reference position. That information might be necessary to avoid excessive twisting of internal cables due to driving the joint too far in one direction, or to provide reassurance that if the robot is reset part-way through a procedure any parts the robot was holding when it was reset can be restored to their original condition. In some applications the shaft whose motion is being sensed is connected to another mechanism that provides a limit to the shaft's travel after some number of rotations. In that situation it is common for the encoder to be calibrated by rotating the shaft until the limit is reached and then resetting the count on the encoder. A count can then be maintained of the net number of transitions detected since the shaft was at the limit, the count being incremented or decremented depending on the direction of rotation. The number of whole rotations undergone since the shaft was at the limit can be determined by dividing the count by the number of transitions expected in a full rotation. One problem with this is that the shaft must be turned to its limit in order to perform the calibration. That may be undesirable in some situations, for example if the shaft is holding an instrument that is inserted into an object that could be damaged by large amounts of rotation of the instrument.

It is desirable to have an improved or alternative way of allowing the position of a rotating object to be sensed.

According to the present invention there is provided a device for sensing the relative rotary position of first and second parts about a rotation axis, the device comprising a follower constrained to move on a first track fast with the first part and on a second track fast with the second part, the first track being linear and the second track comprising a plurality of circular arcs and at least one transition section connecting one of the circular arcs to another, the tracks being arranged so as to convert relative rotation of the parts into linear motion of the follower.

The second track may be generally spiral. Each circular arc may be of constant radius about the rotation axis. The first track may be perpendicular to the rotation axis.

Each circular arc may be of a different radius from the other(s).

All the circular arcs may lie in a single plane perpendicular to the rotation axis.

The second track may be generally helical. Each circular arc may lie in a single plane perpendicular to the rotation axis. The first track may be parallel to the rotation axis.

All the circular arcs may be of the same radius.

Each of the circular arcs may lie in a different plane from the other(s) perpendicular to the rotation axis.

Each circular arc may occupy more than 270° of a circle.

The device may further comprise a sensor for sensing the position of the follower in the first track.

The sensor may be a switch providing a single bit output.

The device may comprise a second sensing mechanism for sensing the absolute or relative rotary position of the first and second parts about the rotation axis over a range not greater than 360°.

The second sensing mechanism may be a magnetic sensing mechanism.

The first and second tracks may be defined by channels. The follower may be located in both channels.

The follower may comprise a rigid linear element located in both channels.

The second track may comprise a passage open to the radial exterior and communicating with the outermost one of the circular arcs whereby the follower can be introduced into the outermost arc of the second track.

According to a second aspect of the present invention there is provided a robot arm comprising a device as set out above. The device may be arranged for sensing rotation about a joint of the arm. The joint may be a revolute joint arranged so that its rotation axis extends longitudinally with respect to the limbs of the arm between which it is located.

The present invention will now be described by way of example with reference to the accompanying drawings.

In the arrangement to be described below, an encoder for the relative rotational position of two objects is capable of absolute determination of the relative rotational position in whole rotations.

(By "absolute determination" is meant that the position can be determined directly from the output of the sensor(s) without, for example, the need to count up the amount of motion since the relative rotational position was in a reference configuration). The absolute determination is preferably over a range greater than 360°. This is achieved by a follower constrained to run (a) in a generally spiral or helical path about the rotation axis and (b) in a linear path along or transverse to the rotation axis. The major portions of the spiral or helical path are circular, so that for the majority of the relative rotational travel of the two objects there is no motion of the follower along the linear path.

Figure 1:
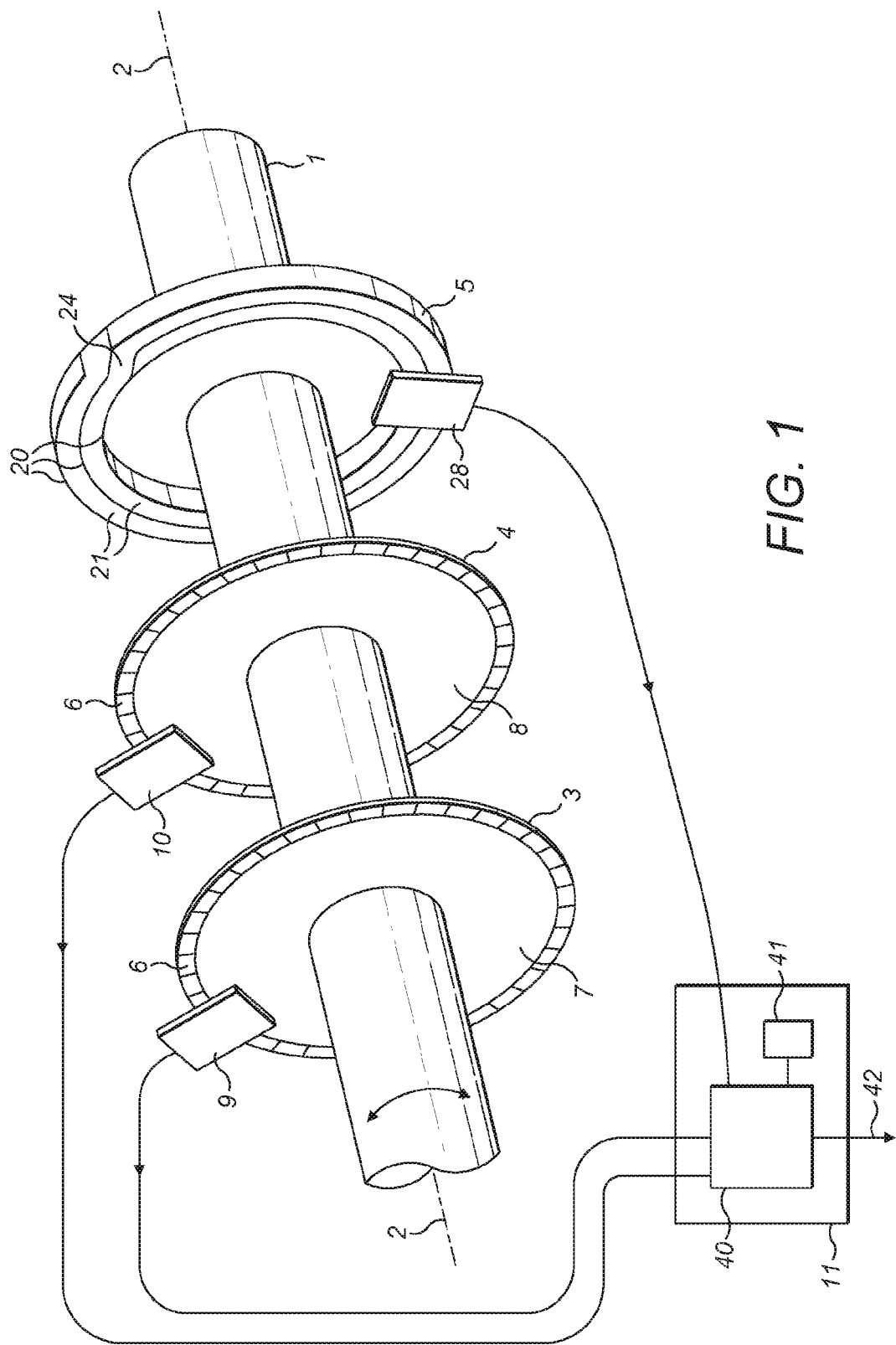
FIG. 1 is a general representation of a shaft equipped with a position encoder mechanism.

FIG. 1 shows a shaft 1 equipped with a position encoder. The position encoder is capable of detecting motion of the shaft, the direction of that motion and the absolute number of rotations of the shaft from a limit position.

The shaft is configured to rotate about a rotation axis 2. Three discs are attached to the shaft so as to rotate with it. Discs 3 and 4 allow for magnetic encoding of rotary position. Disc 5 allows for mechanical encoding of rotary position.

Discs 3 and 4 carry a number of permanent magnets defining magnetic poles 6. On each disc the poles are arranged in a circle having the rotation axis 2 of shaft 1 as its axis. On each disc the magnets are arranged so that around the circle of poles the poles exposed at the sensing surfaces 7, 8 alternate between north and south poles. Magnetic sensors 9, 10 are disposed adjacent to the sensing surfaces 7, 8 and aligned with the rings of magnetic poles 6. The magnetic sensors are fast with the body relative to which shaft 1 rotates: for example by being fixed to a housing for shaft 1. As a result, when the shaft rotates, together with discs 7, 8, the rings of magnetic poles 6 revolve past the sensors 9, 10. The sensors are capable of detecting transitions between north and south poles in the ring of poles as such transitions move past the sensors. The sensors could, for example be Hall effect sensors, reed sensors, magnetoresistive sensors or inductive sensors. For relative position sensing each sensor 9, 10 is arranged so that when a transition from a north pole to a south pole passes the sensor the output of the sensor goes from high to low, and when a transition from a south pole to a north pole passes the sensor the output of the sensor goes from low to high. For absolute position sensing within a range of 360° each sensor is arranged to provide a multi-bit output representing the relative position of the neighbouring poles to it and the rings of poles are arranged such that each position of the shaft within a 360° range is associated with a unique set of outputs from the sensors. This may be achieved by providing different numbers of poles on each ring and making the numbers of poles the rings co-prime to each other. The outputs from the sensors pass to a processing unit 11.

The circumferential positions of the sensors 9, 10 and the rotational positions of the disc 7, 8 about axis 2 are chosen so that the transitions between the poles on disc 7 as sensed by sensor 9 occur for different rotational positions of the shaft from the transitions between the poles on disc 8 as sensed by sensor 10. This allows the direction of rotation of the shaft to be inferred from the relative order of high/low and low/high transitions as sensed by each sensor. The rings and sensors allow a relative position of the shaft to be determined.

The number of magnetic poles around the discs can be selected based on the application; but there could, for example, be around 30 to 40 pairs of north/south poles. For absolute position sensing within a 360° range using the technique described above the numbers of pairs on the rings should be co-prime.

The mechanical encoder comprising disc 5 will now be described.

Disc 5 is fast with the shaft 1 so as to rotate with the shaft. Disc 5 has a series of formations 20 which have an extent along the direction of the shaft. The formations define a generally spiral path 21 in the plane of the disc 5, i.e. in a plane perpendicular to the axis of the shaft. A follower 30 is guided by the formations in a radial direction (i.e. in a direction perpendicular to the axis of the shaft), so that rotation of the shaft can cause motion of the follower in a radial direction. As will be described below, the radial position of the follower can be detected in order to establish the absolute position of the shaft 1 in whole rotations from a reference position.

Figure 2:
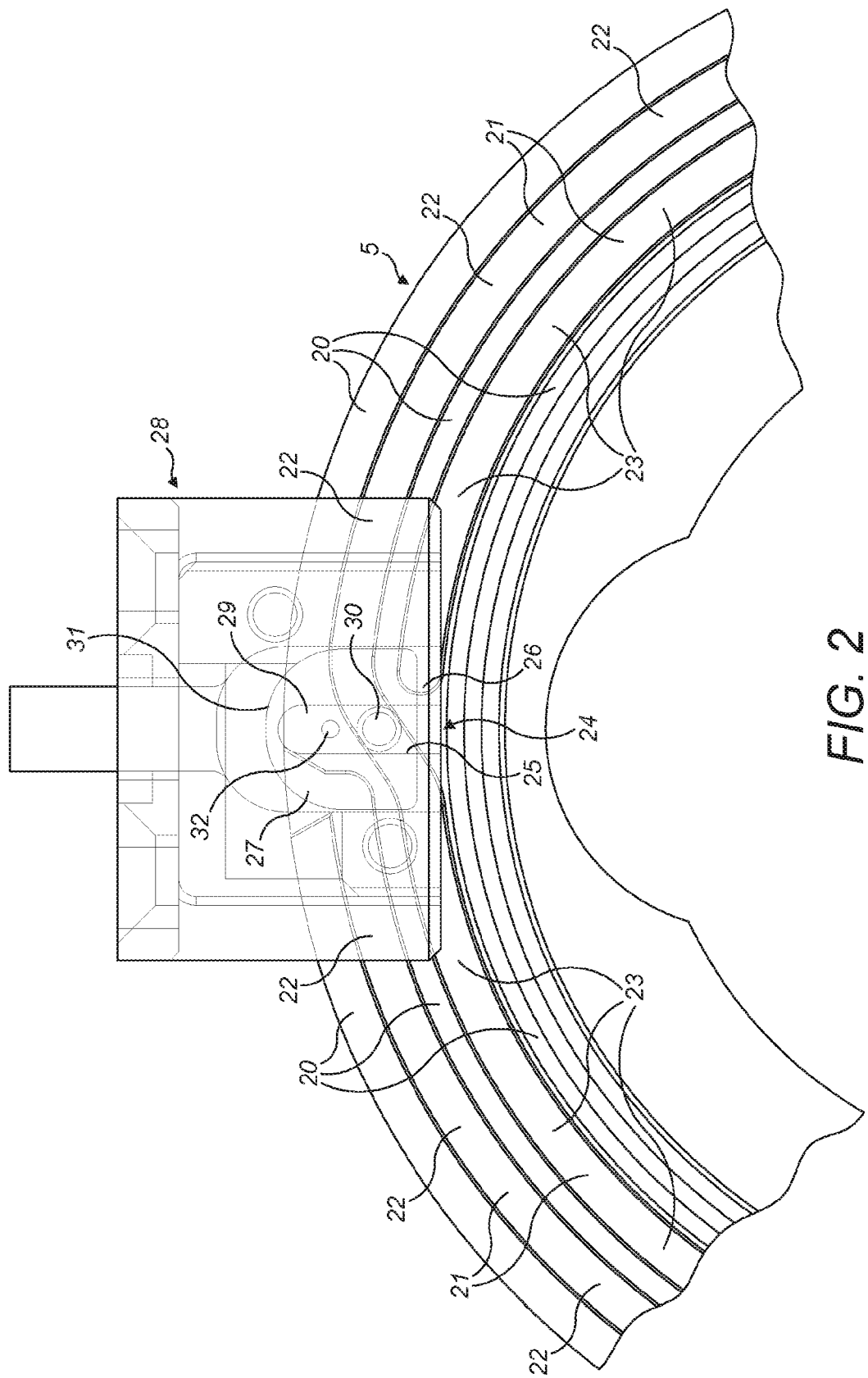
FIG. 2 shows a portion of the periphery of a disc 5 of FIG. 1, illustrating a generally spiral track of the position encoder in more detail.

In more detail, disc 5 has a formation of ridges 20 which extend in an axial direction: i.e. along the axis 2 of the shaft 1. The ridges are configured so as to define a generally spiral groove 21 between them. For the majority of its path the spiral groove is of constant radius about the rotation axis 2, for example as indicated in FIGS. 2 at 22 and 23. The region 22 is of a first radius, and the region 23, which is within region 22, is of a second radius smaller than the first radius. In a transition region 24 the ridges are configured so as to define a smooth change in radius of the groove between the first radius and the second radius, as indicated at 25. The interior track 23 of the groove terminates in an end wall 26. The exterior track 23 of the groove terminates in a radial passageway 27 which extends radially outwardly and opens to the circumference of the disc 5.

A mechanical sensing device 28 is located adjacent to disc 5. The mechanical sensing device is fast with the body relative to which shaft 1 rotates: for example by being fixed to a housing for shaft 1. As a result, when the shaft rotates the disc 5, which is fast with the shaft, rotates past the sensing device 28. The sensing device has a track 29 within which follower 30 is constrained to move. The track 29 is directed perpendicular to axis 2. The follower is a pin extending along the axis 2. The pin runs snugly in the groove 21 and also in the track 29. The mechanical sensing device is arranged to maintain the orientation of the pin parallel to the axis 2, for example by constraining a flat head 31 of the pin (shown with a D-shape in FIG. 2) to prevent rotation of the head about axes perpendicular to axis 2.

The interaction of the track 29, the groove 21 and the follower 30 is such that when the disc 5 is rotated the position of the follower in a radial direction within the groove is controlled by its running in groove 21. When one of the regions of the groove 22, 23 that have constant cross-section are aligned with the track 29 the disc can rotate without the follower 30 moving in track 29. The follower will remain in either a radially outward position aligned with groove portion 22 or a radially inward position aligned with groove portion 23. When the shaft is rotated so that the transition region 24 revolves past the track 29 the follower is forced from a radially inward position to a radially outward position (when the shaft is turned anti-clockwise as viewed in FIG. 2) or from a radially outward position to a radially inward position (when the shaft is turned clockwise as viewed in FIG. 2).

A microswitch 32 is positioned so as to detect when the follower 30 is in its radially outward position: i.e. aligned with groove portion 22. The output of the microswitch forms the output of the mechanical sensor device 28, and is passed to the processing unit 11. The radial position of the follower 30 in track 29 could be detected in other ways. For example, its presence could be detected at the radially inner position rather than the radially outer position; and the detector could be a single bit (on/off) switch (e.g. a mechanical, magnetic or optical switch) or could provide a more detailed indication of position along the length of the track 29. The output of the sensor 28 is an absolute position signal indicating the number of revolutions of the shaft from a reference point.

The outputs of sensors 9, 10, 28 pass to the processing unit 11. The processing unit comprises a processor device 40, which could be hard coded to interpret the signals from the sensors 9, 10, 28 or could be a general purpose processor configured to execute software code stored in a non-transient way in memory 41. The processor device combines the signals from the sensors to form an integrated output signal at 42.

The data from the sensors may be used by the processor device 40 in a number of ways.

1. The mechanical encoder arrangement 5, 28 could be implemented (either by itself or together with another position encoder such as that provided by discs and sensors 3, 4, 9, 10) to provide a simple output representing the number of whole revolutions of the shaft 1 from a reference location. If the reference location is taken to be the end 26 of the path 21 then non-detection of the follower 30 by micro switch 32 could indicate zero revolutions and detection of the follower 30 by microswitch 32 could indicate one revolution.

2. The mechanical encoder arrangement 5, 28 could be used to indicate a reference location for resetting the relative position count associated with the relative position measurement system. When the count is desired to be reset the output of the mechanical position encoder is known. The shaft 1 is then rotated in a direction selected in dependence on that output so as to move the transition zone 24 towards the follower. With reference to FIG. 2, if the output of the mechanical position encoder indicates that the follower is in outer track region 22 then the shaft is rotated clockwise and if the output of the mechanical position encoder indicates that the follower is in inner track region 23 then the shaft is rotated anti-clockwise. This determination may be made by the processing unit 11 in response to a signal to reset the count, and signalled to a drive unit (e.g. a motor) for driving the shaft in the appropriate direction. When the processing unit subsequently detects a transition of the output of the mechanical position encoder it knows that the transition zone is aligned with the sensor 28. At that point the count can be reset. This approach has the advantage that it avoids the need to move the shaft to an extreme position to reset the count at a position where both the rotational position and the number of rotations of the shaft from a predetermined reference position are known. It may be that the precise rotational position of the shaft at which the output of the mechanical switch transitions when the follower is in the transition region 28 is different depending on the rotation direction of the shaft. In that case, the same procedure as above can be followed, but in one direction of the shaft when the transition is detected in the output from sensor 28 the shaft is then turned in the opposite direction and the subsequent transition used to indicate resetting of the count.

3. In the example described above, the discs and sensors 7, 8, 9, 10 are capable of sensing relative position. In an alternative arrangement they could be capable of sensing absolute position within a 360° revolution of the shaft. This can be done in a number of ways. For example, the sensors 9, 10 could be capable of sensing their relative position between magnetic poles 6 and outputting an analogue or multi-bit representation of that relative position, and the numbers of poles on the discs 7, 8 could be selected so that in combination the sensors 9, 10 yield a value uniquely representing the position of the shaft within a 360° revolution. In another example, the poles could be located on the discs in a binary encoded fashion, so that in combination the sensors yield a digital output uniquely representing the position of the shaft within a 360° revolution. In combination with the mechanical encoding arrangement 5, 24 this approach allows the absolute position of the shaft both within a 360° revolution and in whole revolutions from an end point to be immediately determined without the need for movement of the shaft. This is useful in that it allows the position of the shaft to be fully determined immediately on start-up of the system, without the requirement for a calibration step as discussed at 2 above.

In the example discussed above, the groove 21 varies in radius about axis 2 and the radial position of the follower 30 indicates the absolute position of the shaft. In an alternative arrangement the grove could be a generally helical groove, and the follower could move axially in the groove to indicate absolute shaft position. Over the majority of its length such a helical groove would be of constant position along axis 2, and there would be a transition zone in which its axial position varies with radial position of the shaft. The track 29 would be disposed in an axial direction. The sensor 32 would sense axial motion of the follower.

The part circular arcs 22, 23 or their helical equivalents preferably extend over more than half a circle, more preferably over more than 270°, more preferably over more than 300°. The transition zone 25 preferably extends at 50° or less to the arcs where it connects to them, as shown in FIG. 2. The transition zone preferably includes a linear path section.

Instead of running in a groove 21/29 the follower 30 could be guided in another way, for example by riding on a raised track which it overlaps on either side.

Slot 27 which extends to the periphery of the disc 5 can be used to help assemble the mechanical position encoder. In the example of FIGS. 1 and 2, during assembly the sensor 28 can be introduced radially to the disc and the follower inserted into the spiral channel 21 through the slot 27.

In the example of FIGS. 1 and 2 the mechanical sensor can distinguish only between zero and one whole rotations from the end stop 26. The spiral groove could be extended to cover more revolutions, with a zone of constant radius for each rotation covered by the groove and a transition zone between each pair of adjacent constant radius zones. The transition zones would be located at a common circumferential position about the rotation axis 2. Similarly, in the case of a helical groove the groove could be extended to cover more revolutions, with a zone of constant axial position for each rotation covered by the groove and a transition zone between each pair of adjacent constant axial position zones. In this case the transition zones would again be located at a common circumferential position about the rotation axis 2. The sensor device 28 would be adapted so that it can determine which of the constant radial/axial position zones the follower is aligned with. For example, the sensor device could have multiple microswitches, one aligned with each of the constant radial/axial position zones, or with all but one of those zones.

In the example above, the discs and sensors 3, 4, 9, 10 sense relative position by means of magnetic interaction between the discs and the sensors. They could sense motion in other ways. For example the sensors could be optical sensors that sense transitions from one colour or reflectivity to another on a rotating disc, or the sensors could be eddy current or other electrical sensors that detect the presence or absence of a tooth on a toothed wheel rotating past a sensor. If the sensors 3, 4 are magnetic sensors they could be of any suitable type, for example Hall effect or reed switch sensors.

The control mechanism for the shaft could be arranged so as to automatically prevent over-rotation of the shaft past the end positions 26, 27 in dependence on position data output by the processing unit 11.

Instead of being attached to a shaft the discs could be attached to any other part that rotates relative to another part. In the case of a shaft, one or more of the discs could be attached to the housing of the shaft and the sensors could rotate with the shaft. The discs could be replaced by members having the same function but different shapes, e.g. they could be of the form of a cylinder, an annulus or a cuboid.

Some applications of the arrangement are as follows. The arrangement could be used in a robot arm in which rigid members forming the limbs of the arm are coupled by revolute joints. The shaft could be fast with one limb of the arm and the housing could be formed by the adjoining limb of the arm, revolution of the shaft relative to that housing representing relative rotation of the two limbs. The position encoding arrangement can then be used to establish the relative position of the arms. In another example, the shaft could be the shaft extending from a vehicle's steering wheel and the housing could be the housing for that shaft, which is part of the main body of the vehicle. Motion of the steering shaft could be sensed to control an electrical power steering system or simply to establish the steering demand (e.g. so as to help control the vehicle's stability control system).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of calibrating a device for sensing a relative rotary position of first and second parts about a rotation axis, the device comprising a mechanical encoder arrangement and a relative position measurement system, the method comprising:

receiving an output of the mechanical encoder arrangement at a processing unit, the mechanical encoder arrangement comprising a follower constrained to move on a first track fast with the first part and on a second track fast with the second part, the first track being linear and the second track comprising a plurality of circular arcs and at least one transition section connecting one of the circular arcs to another, the tracks being arranged so as to convert relative rotation of the parts into linear motion of the follower, and a first sensor for detecting the position of the follower in the first track;

the processing unit causing the first part to rotate in a direction selected in dependence on the output of the mechanical encoder arrangement so as to move the at least one transition section towards the follower; and in response to detecting, at the processing unit, a transition of the output of the mechanical encoder arrangement, resetting a count of a number of transitions detected by the relative position measurement system, the relative position measurement system comprising a disc or wheel fast with the first part and a second sensor fast with the second part, the second sensor configured to detect transitions in the disc or wheel when the disc or wheel moves past the sensor.

2. The method of claim 1, wherein the output of the mechanical encoder arrangement indicates which of the plurality of circular arcs the follower is in.

3. The method of claim 2, wherein the processing unit causes the first part to rotate in a first direction when the output of the mechanical encoder arrangement indicates that the follower is in a first circular arc of the plurality of circular arcs, and the processing unit causes the first part to rotate in a second direction when the output of the mechanical encoder arrangement indicates that the follower is in a second circular arc of the plurality of circular arcs.

4. The method of claim 3, wherein one of the first and second directions is clockwise and the other of the first and second directions is anti-clockwise.

5. The method of claim 3, further comprising:

when the selected direction is a specific one of the first and second directions, in response to detecting a first transition of the output of the mechanical encoder arrangement, causing the first part to rotate in the other of the first and second directions; and wherein the resetting of the counter is performed in response to detecting a second transition of the output of the mechanical encoder arrangement.

6. The method of claim 1, wherein the first sensor is a switch providing a single bit output.

7. The method of claim 1, wherein the count is incremented or decremented when the second sensor detects a transition.

8. The method of claim 1, wherein the disc or wheel comprises a ring around which is arranged a set of alternating magnetic poles, and the second sensor is a magnetic sensor configured to detect transitions in magnetic polarity when the poles moves past the second sensor.

9. The method of claim 1, wherein causing the first part to rotate in the selected direction comprises signalling to a drive unit for driving the first part to drive the first part to rotate in the selected direction.

10. The method of claim 1, wherein the causing the first part to rotate in the selected direction is performed in response to receiving a signal to reset the count.

11. The method of claim 1, wherein the second track is generally spiral, each circular arc is of constant radius about the rotation axis and the first track is perpendicular to the rotation axis.

12. The method of claim 11, wherein each circular arc is of a different radius from the other(s), and/or wherein all the circular arcs lie in a single plane perpendicular to the rotation axis.

13. The method of claim 1, wherein the second track is generally helical, each circular arc lies in a single plane perpendicular to the rotation axis and the first track is parallel to the rotation axis.

14. The method of claim 13, wherein all the circular arcs are of the same radius, and/or wherein each of the circular arcs lies in a different plane from the other(s) perpendicular to the rotation axis.

15. The method of claim 1, wherein each circular arc occupies more than 270° of a circle.

16. The method of claim 1, wherein the first and second tracks are defined by channels and the follower is located in both channels.

17. The method of claim 16, wherein the follower comprises a rigid linear element located in both channels.

18. The method of claim 16, wherein the second track is generally spiral, each circular arc is of constant radius about the rotation axis and the first track is perpendicular to the rotation axis, and wherein the second track comprises a passage open to the radial exterior and communicating with the outermost one of the circular arcs whereby the follower can be introduced into the outermost arc of the second track.

19. The method of claim 1, wherein the device is arranged for sensing rotation about a joint of a robot arm.

20. The method of claim 19, wherein the joint is a revolute joint arranged so that its rotation axis extends longitudinally with respect to the limbs of the arm between which it is located.

\* \* \* \* \*